United States Patent
Mazzucco et al.

(10) Patent No.: US 8,198,383 B2
(45) Date of Patent: Jun. 12, 2012

(54) PROCESS FOR THE GAS-PHASE POLYMERIZATION OF OLEFINS

(75) Inventors: Antonio Mazzucco, Ferrara (IT); Riccardo Rinaldi, Mantova (IT); Silvia Soffritti, Ferrara (IT); Enrico Balestra, Ferrara (IT); Giuseppe Penzo, Mantova (IT); Gabriele Mei, Ferrara (IT)

(73) Assignee: Basell Poliolefine Italia, s.r.l., Milan (IT)

( * ) Notice: Subject to any disclaimer, the term of this patent is extended or adjusted under 35 U.S.C. 154(b) by 87 days.

(21) Appl. No.: 12/735,090

(22) PCT Filed: Dec. 17, 2008

(86) PCT No.: PCT/EP2008/067772
§ 371 (c)(1),
(2), (4) Date: Jun. 15, 2010

(87) PCT Pub. No.: WO2009/080660
PCT Pub. Date: Jul. 2, 2009

(65) Prior Publication Data
US 2010/0317811 A1    Dec. 16, 2010

Related U.S. Application Data

(60) Provisional application No. 61/010,533, filed on Jan. 9, 2008.

(30) Foreign Application Priority Data

Dec. 21, 2007 (EP) ..................... 07150383

(51) Int. Cl.
*C08F 2/00* (2006.01)
*C08F 210/00* (2006.01)
*C08F 110/02* (2006.01)
*B01J 19/18* (2006.01)
*B01J 8/18* (2006.01)

(52) U.S. Cl. .......... 526/65; 526/348; 526/352; 422/132; 422/139

(58) Field of Classification Search .................... 526/65, 526/348, 352; 422/132, 139
See application file for complete search history.

(56) References Cited

U.S. PATENT DOCUMENTS
5,698,642 A    12/1997   Govoni et al.
(Continued)

FOREIGN PATENT DOCUMENTS
EP    782587    7/1997
EP    1012195   6/2000
(Continued)

OTHER PUBLICATIONS

J. Yerushalmi, "High Velocity Fluidized Beds", *Gas Fluidization Technology*, Edited by D. Geldart, Wiley & Sons Ltd., p. 155-196 (1986).

*Primary Examiner* — William Cheung
(74) *Attorney, Agent, or Firm* — Dilworth IP LLC

(57) ABSTRACT

A process for the gas-phase polymerization of α-olefins carried out in two interconnected polymerization zones, wherein the growing polymer particles flow through the first of said polymerization zones (riser) under fast fluidization conditions, leave said riser and enter the second of said polymerization zones (downcomer) through which they flow downward in a densified form, the process being characterized in that: (a) the gas mixture present in the riser is totally or partially prevented from entering the downcomer by introducing into the upper part of said downcomer a liquid stream LB having a composition different from the gaseous mixture present in the riser; (b) the ratio R between the flow rate $F_p$ of polymer circulated between said downcomer and said riser and the flow rate LB of said liquid being adjusted in a range from 10 to 50.

8 Claims, 1 Drawing Sheet

U.S. PATENT DOCUMENTS

| | | |
|---|---|---|
| 6,413,477 B1 | 7/2002 | Govoni et al. |
| 6,689,845 B1 | 2/2004 | Govoni et al. |
| 6,818,187 B2 | 11/2004 | Govoni et al. |
| 7,514,508 B2 * | 4/2009 | Meier et al. .................... 526/65 |
| 7,687,588 B2 | 3/2010 | Mei et al. |
| 2007/0159628 A1 | 7/2007 | Schmidt et al. |

FOREIGN PATENT DOCUMENTS

| | | | |
|---|---|---|---|
| WO | 00/02929 | | 1/2000 |
| WO | WO 00/02929 | * | 1/2000 |
| WO | 2004/078792 | | 9/2004 |
| WO | 2005/019280 | | 3/2005 |
| WO | 2006/120187 | | 11/2006 |

* cited by examiner

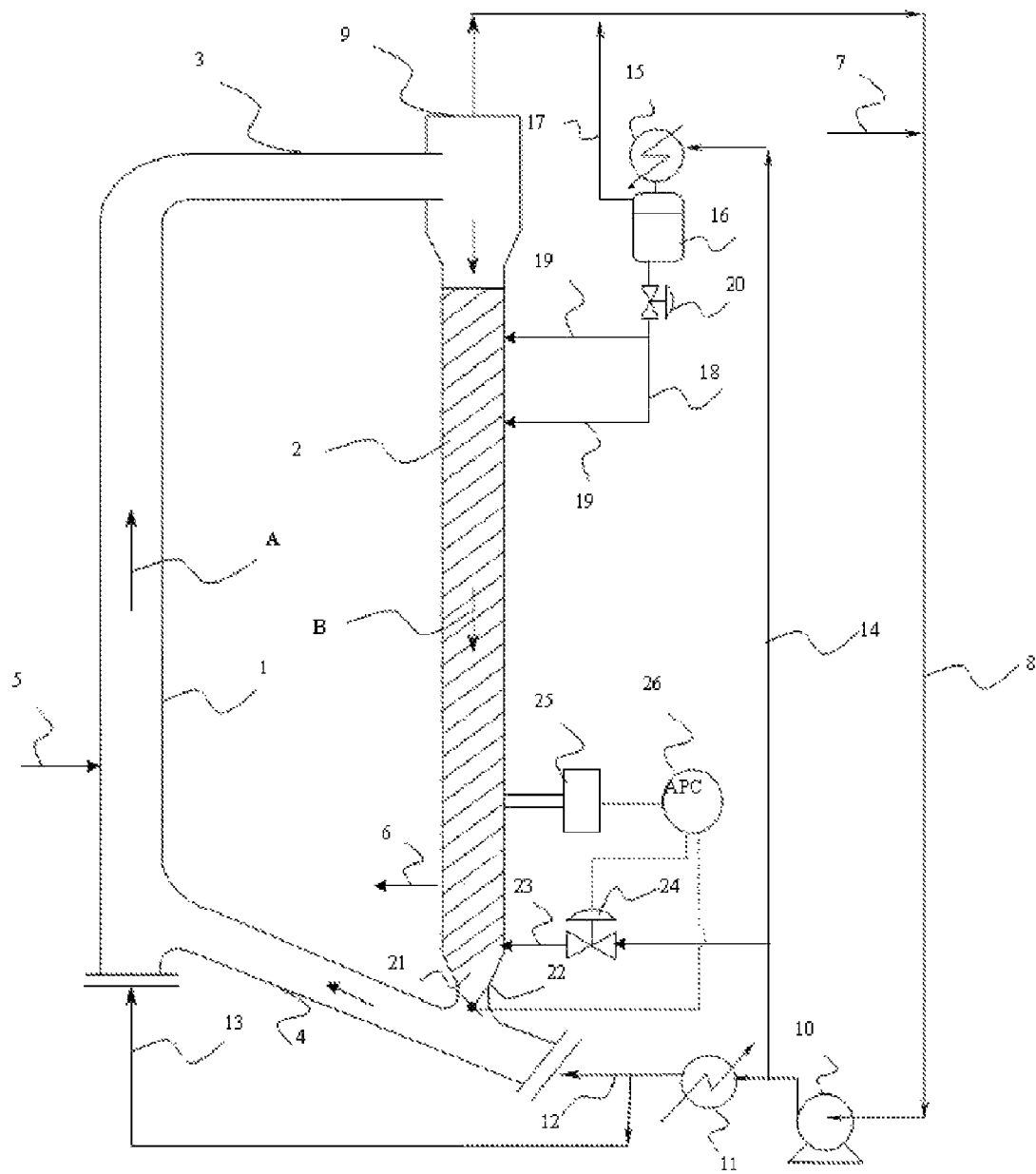

PROCESS FOR THE GAS-PHASE POLYMERIZATION OF OLEFINS

This application claims priority to European Patent Application 07150383.3 filed 21 Dec. 2007 and provisional U.S. Appl. No. 61/010,533 filed 9 Jan. 2008; the disclosures of European Application 07150383.3 and U.S. application Ser. No. 61/010,533, each as filed, are incorporated herein by reference.

The present invention relates to a gas-phase polymerization process for the olefin polymerization carried out in a polymerization apparatus provided with two interconnected polymerization zones. In particular, the present invention is addressed to improve the operative conditions in the second polymerization zone of this polymerization apparatus. The development of olefin polymerization catalysts with high activity and selectivity, particularly of the Ziegler-Natta type and, more recently, of the metallocene type, has led to the widespread use on an industrial scale of processes in which the polymerization of olefins is carried out in a gaseous medium in the presence of a solid catalyst.

A widely used technology for gas-phase polymerization processes is the fluidized bed technology. In fluidized bed gas-phase processes, the polymer is confined in a vertical cylindrical zone (polymer bed). The reaction gases exiting the reactor are taken up by a compressor, cooled and sent back, together with make-up monomers and appropriate quantities of hydrogen, to the bottom of the polymer bed through a distribution plate. Entrainment of solid from the gas exiting the reactor is limited by an appropriate dimensioning of the upper part of the reactor (freeboard, i.e. the space between the upper bed surface and the gas exit point), where the gas velocity is reduced, and, in some designs, by the interposition of cyclones in the gases exit line. The flow rate of the circulating gaseous monomers is set so as to assure a velocity within an adequate range above the minimum fluidization velocity and below the "transport velocity". The heat of reaction is removed exclusively by cooling the circulating gas. The composition of the gas-phase controls the composition of the polymer, while the reaction kinetics is controlled by the addition of inert gases. The reactor is operated at constant pressure, normally in the range 1-4 MPa.

A significant contribution to the reliability of the fluidized bed reactor technology in the polymerization of $\alpha$-olefins was made by the introduction of suitably pre-treated spheroidal catalyst of controlled dimensions and by the use of propane as a diluent component for the heat removal optimization.

Since fluidized bed reactors approximate very closely the ideal behavior of a "continuous stirred-tank reactor" (CSTR), it is very difficult to obtain products which are a homogeneous mixture of different types of polymeric chains. In fact, the composition of the gaseous mixture that is in contact with the growing polymer particle is essentially the same for all the residence time of the particle in the reactor. As a consequence, one of the major limits of fluidized bed processes is the difficulty of broadening the molecular weight distribution of the obtained polymers. The breadth of the molecular weight distribution has an influence both on the rheological behavior of the polymer (and hence the handling/processability of the polymer melt) and on the final mechanical properties of the product, and is a property particularly important for the (co) polymers of ethylene.

This problem has been addressed in EP-B-782587. According to this patent, it is possible to broaden the molecular weight distribution of polymers without affecting their homogeneity by means of a gas-phase process performed in a loop reactor responding to particular criteria of design. The gas-phase polymerization according to EP-B-782587 is carried out in two interconnected polymerization zones to which one or more monomers are fed in the presence of a catalyst under reaction conditions and from which the produced polymer is discharged. The process is characterized in that the growing polymer particles flow through the first of said polymerization zones under fast fluidization conditions, leave said first polymerization zone and enter the second polymerization zone, through which they flow in a densified form under the action of gravity, leave the second polymerisation zone and are reintroduced into the first polymerisation zone, thus establishing a circulation of polymer between the two polymerisation zones.

According to the description of EP-B-782587, it is possible to broaden the molecular weight distribution of the polymers simply by properly balancing the gas-phase compositions and the residence times in the two polymerisation zones of the gas-phase loop reactor. This is due to the fact that, while the polymer moves forward in the second polymerisation zone flowing downward in a plug-flow mode, owing to the monomer consumption, it finds gas-phase compositions richer in molecular weight regulator. Consequently, the molecular weights of the forming polymer decrease along the axis of this polymerization zone.

Different from the fluidized bed reactor technology, wherein the polymer particles grow in a fluidization state and their mutual distance is such to prevent their agglomeration, the new gas-phase technology described in EP-B-782587 has to cope with the occurrence of clogging of the gas-phase reactor. In fact, a relevant technical feature of this technology is given by the downward flow of polymer in a densified form along the second polymerization zone: high values of density of the solid are reached (density of the solid=kg of polymer per $m^3$ of reactor) in this portion of reactor. Due to this high concentration of polymer, a relatively limited amount of gas is available as a cooling medium inside the second polymerization zone. The polymerization reaction is exothermic and the heat of polymerization has to be removed by said limited amount of gas surrounding the polymer particles; moreover, the flow of gas moves slowly downward along said second polymerization zone and this limits considerably the heat exchange coefficient. As a consequence, the temperature of the polymer increases while it descends in the second polymerization zone, so that in the bottom part thereof the situation is particularly critical. Moreover, the motion of the polymer particles close to the reactor wall is made slower by the friction exerted by the wall. Hot spots can cause the polymer softening and the tackiness between adjacent polymer particles can lead to the formation of polymer lumps: the growth of said polymer lumps can partially clog this second polymerization zone with detrimental effects on the whole polymerization process. According to the description of EP-B-1012195, it is possible to obtain, within the polymerization apparatus, two polymerization zones at different compositions by feeding a gas/liquid mixture to the top of the second polymerization zone. Said gas/liquid mixture acts as a barrier to the gas coming from the first polymerization zone. The introduction of the gas/liquid mixture of different composition into the second polymerization zone is such to establish a net gas flow upward at the upper limit of this polymerization zone. The established flow of gas upward has the effect of preventing the gas mixture present in the first polymerization zone from entering the second polymerization zone. The process disclosed in EP-B-1012195 reveals particularly useful to prepare bimodal homopolymers or copolymers. It has been further observed that the feeding of a liquid stream is also useful to improve the flowability of polymer particles along the second polymerization zone (also denominated as downcomer): in fact, the fall of the liquid onto the downcomer walls originates a liquid layer interposed between the polymer particles and the reactor wall, thus reducing the friction of the polymer onto the wall. As a result, the flowability of the polymer particles close to the downcomer walls is improved. However, when the flow rate of liquid exceeds certain values, the quick evaporation of the liquid inside the downcomer may generate a flow of vapor, capable of locally fluidizing the polymer particles or locally generating a sluggish behavior of the descendent polymer: this clearly interrupts the regular plug flow of the polymer along the downcomer and gives the undesired effect of making the residence time of the particles non-homogeneous inside the downcomer. As a consequence, excessively high residences times of the particles or their stagnation in the downcomer can cause hot spots with consequent polymer softening and undesirable formation of polymer lumps in the downcomer.

It would be highly desirable to ensure a correct working of the downcomer when bimodal polymers are produced by means of the introduction of a liquid barrier at the top of the downcomer.

It has now been found an improvement in the operability of the above gas-phase technology, which allows to operate the downcomer without some drawbacks correlated with the feeding of a liquid barrier at the top of the second polymerization zone.

It is therefore an object of the present invention a process for the gas-phase polymerization of α-olefins $CH_2=CHR$, where R is hydrogen or a hydrocarbon radical having 1-12 carbon atoms, carried out in two interconnected polymerization zones, wherein the growing polymer particles flow through the first of said polymerization zones (riser) under fast fluidization conditions, leave said riser and enter the second of said polymerization zones (downcomer) through which they flow downward in a densified form, leave said downcomer and are reintroduced into said riser, thus establishing a circulation of polymer between the riser and the downcomer, the process being characterized in that:

(a) the gas mixture present in the riser is totally or partially prevented from entering the downcomer by introducing into the upper part of said downcomer a liquid stream $L_B$ having a composition different from the gaseous mixture present in the riser;

(b) the ratio R between the flow rate $F_p$ of polymer circulated between said downcomer and said riser and the flow rate $L_B$ of said liquid being adjusted in a range from 10 to 50.

The process of present is addressed to improve the operability of a gas-phase reactor having interconnected polymerization zones of the type described in EP 782 587 and EP 1012195. In the first polymerization zone (riser), fast fluidization conditions are established by feeding a gas mixture comprising one or more alpha-olefins at a velocity higher than the transport velocity of the polymer particles. The velocity of said gas mixture is generally comprised between 0.5 and 15 m/s, preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the second polymerization zone (downcomer), the polymer particles flow under the action of gravity in a densified form, so that high values of density of the solid (mass of polymer per volume of reactor) are achieved, said density of solid approaching the bulk density of the polymer.

Throughout the present description a "densified form" of the polymer implies that the ratio between the mass of polymer particles and the reactor volume is higher than 80% of the "poured bulk density" of the obtained polymer. Thus, for instance, in case of a polymer bulk density equal to 420 $Kg/m^3$, "densified conditions" of the polymer flow are satisfied if the polymer mass/reactor volume ratio is higher than 336 $kg/m^3$. The "poured bulk density" of a polymer is a parameter well known to the person skilled in the art: it can be measured according to ASTM D1895/69. In view of the above explanation, it is clear that in the downcomer the polymer flows downward in a plug flow and only small quantities of gas are entrained with the polymer particles.

The operating parameters, such as temperature and pressure, are those that are usual in gas-phase catalytic polymerization processes. For example, in both riser and downcomer the temperature is generally comprised between 60° C. and 120° C., while the pressure can ranges from 5 to 50 bar.

According to the process of the present invention the two interconnected polymerization zones are operated by satisfying both the above features (a) and (b). In particular, the condition (a) requires the gas mixture coming from the riser to be totally or partially prevented from entering the downcomer by introducing into the upper part of the downcomer a liquid stream having a composition different from the gaseous mixture present in the riser. In order to comply with condition (a), one or more feeding lines for a liquid are preferably placed close to the upper limit of the volume occupied by the densified solid in the downcomer.

This liquid mixture fed into the upper part of the downcomer totally or partially replaces the gas mixture entrained with the polymer particles entering the downcomer. The partial evaporation of said liquid mixture generates in the upper part of the downcomer a flow of gas, which moves countercurrently to the flow of descendent polymer, thus acting as a barrier to the gas mixture coming from the riser and entrained among the polymer particles. The established upward flow of gas has the effect of preventing the gas mixture present in the riser from entering the downcomer.

The above feature (a) causes a difference in the monomers concentration or hydrogen (molecular weight regulator) concentration between the riser and the downcomer, so as a bimodal polymer can be produced by the gas-phase polymerization reactor.

The liquid mixture of different composition to be fed at the upper part of the downcomer can be sprinkled over the surface of the polymer particles: the evaporation of the liquid in the polymerization zone will provide the required gas flow.

The above defined feature (b) is instead aimed to avoid the generation of relevant flows of vapor in the downcomer region underlying the introduction points of the liquid barrier, so as to prevent both polymer fluidization and sluggish conditions in the downcomer, with the advantage of not to compromise the regular plug flow of the polymer descending along the downcomer. Feature b) takes into account a very important parameter of the gas-phase reactor having interconnected polymerization zones, that is to say the flow rate $F_p$ of polymer which is passed from the downcomer to the riser, thus establishing a continuous circulation of polymer between the two interconnected polymerization zones.

$F_p$ may be also defined as the flow rate of polymer which by-passes the polymer discharge from the gas-phase reactor, the discharge line being arranged in the second polymerization zone. Generally, only a minor amount of polymer is discharged from the discharge line of the gas-phase reactor, while the remaining part of polymer is continuously circulated along the two interconnected polymerization zones according to a loop configuration.

The higher is the plant productivity, the higher is the flow rate of circulated polymer: in case of polymerization in an industrial plant, $F_p$ may vary according to a broad range, being comprised between 100 t/h and 2500 t/h. Generally, the ratio between the flow rate $F_p$ of circulated polymer and the flow rate of polymer discharged from the reactor ranges from 10 to 60, preferably from 15 to 45.

According to the process of present invention, the amount of liquid $L_B$ which may be fed to the upper part of the downcomer is strictly correlated with the flow rate $F_p$ of continuously circulated polymer. Feature (b) of instant invention gives the suitable operative conditions to be established in the polymerization process in order to obtain a bimodal polymer without incurring in severe drawbacks during the working of the downcomer. In particular, the ratio $R=F_p/L_B$ should be maintained at values comprised between a lower limit of 10 and an upper limit of 50.

The comparative examples of present Application clearly demonstrates that when operating at R>50, the liquid barrier fed at the top of the downcomer is not able to ensure a satisfying bimodality of the desired polymer, while operating at R<10, it becomes very difficult to operate the second polymerization zone, since the regular plug flow of the descending polymer is compromised. It has been further found that the best conditions of operability of the downcomer are achieved when adjusting the ratio $R=F_p/L_B$ at values comprised between 12 and 30.

According to an embodiment of the present invention, the liquid barrier $L_B$ to be fed into the downcomer can be obtained from the condensation of the fresh olefin monomers: in this case, a part of the fresh monomers to be polymerized are directly fed into the downcomer in a liquid form.

According to a preferred embodiment, the liquid barrier $L_B$ comes from the condensation or distillation of a part of the gas stream continuously recycled to the gas-phase reactor. The recycle gas stream is generally withdrawn from a gas/solid separator placed downstream the riser, cooled by passage through an external heat exchanger and then recycled to the bottom of the riser. The temperature of the recycle gas stream can be suitably adjusted in the heat exchanger to maintain the first polymerization zone at the desired polymerization temperature. The recycle gas stream generally comprises, besides the gaseous monomers, also inert polymerization components, such as for instance propane, and chain transfer agents, such as hydrogen. As a consequence, the liquid barrier Lb fed to the second polymerization zone may contain, besides the monomers to be polymerized, also condensable inert compounds used as a polymerization diluent: the preferred ones are $C_2$-$C_8$ alkanes, such as propane, butane, isopentane and hexane. Moreover, the composition of said liquid barrier derived from the recycle gas line may be suitably adjusted by feeding liquid make-up monomers, and liquid polymerization diluents before its introduction into the downcomer. The process of the present invention will now be described in detail with reference to the enclosed FIGURE, which has to be considered illustrative and not limitative of the scope of the invention.

THE BRIEF DESCRIPTION OF THE DRAWINGS

FIG. 1 is a diagrammatic representation of a gas-phase polymerization apparatus having two interconnected polymerization zones, as described in EP-B782587 and EP-B-1012 195. The polymerization reactor comprises a first polymerization zone 1 (riser), wherein the polymer particles flow upward under fast fluidization conditions along the direction of the arrow A and a second polymerization zone 2 (downcomer), wherein the polymer particles flow downward under the action of gravity along the direction of the arrow B. The two polymerization zones 1 and 2 are appropriately interconnected by the sections 3 and 4. The catalyst components, preferably after a prepolymerization step, are continuously introduced via line 5 into the riser 1. The produced polyolefin is continuously discharged from the second polymerization zone via the discharge line 6, which is placed at the bottom part of the downcomer 2.

A gaseous mixture comprising one or more olefins, hydrogen and preferably an alkane, preferably propane as a polymerization diluent, is fed to the polymerization reactor via one or more lines 7, suitable placed at any point of the gas recycle line 8 according to the knowledge of a person skilled in art.

The growing polymer particles and the gaseous mixture leave the riser 1 and are conveyed to a solid/gas separation zone 9, from which the polymer particles are separated from part of the gas stream. The separated polymer enters the downcomer 2, while a gaseous mixture flows upward to the top of said separation zone 9 and successively enters the gas recycle line 8. The recycle gas mixture is compressed by means of the compressor 10 and then split in two gaseous streams: the first one is cooled by the heat exchanger 11, and then fed to the connection section 4 via line 12 and also to the bottom of the riser 1 via line 13.

The second gaseous stream, split downstream the compressor 10, is fed via line 14 to the condenser 15, where it is cooled to a temperature at which the monomers and optional condensable inert gases are partially condensed. A separating vessel 16 is placed downstream the condenser 15. The separated gaseous mixture, enriched in hydrogen, is returned back via line 17 to the recycle line 8. On the contrary, the liquid collected at the bottom of separating vessel 16 enters line 18 before being fed to the downcomer 2. This stream of liquid barrier Lb is introduced into the downcomer 2 by means of one or more feeding lines 19 placed along the upper portion of the downcomer 2. More feeding points can be arranged in correspondence of a same cross section of the downcomer in order to favor the uniform distribution of liquid inside the downcomer. A control valve 20 is placed on line 18 to adjust the flow rate Lb of liquid directly introduced in the upper part of downcomer 2.

The bottom of the downcomer 2 converges into a restriction 21, shaped as a funnel. A control valve 22 with an adjustable opening is conveniently placed inside said restriction 21. The flow rate Fp of polymer continuously circulated between the downcomer 2 and the riser 1 is adjusted by the level of opening of control valve 22. The control valve 22 may be a mechanical valve, such as a butterfly valve, a ball valve, etc. or also a non-mechanical valve, such as a L-valve, a J-valve, etc.

A stream of a gas, also denominated as the "dosing gas", is fed into the lower part of the downcomer 2 by means of a line 23 placed above a suitable distance from the restriction 21. The dosing gas to be introduced through line 23 is conveniently taken from the recycle line 8, more precisely, downstream the compressor 10 and upstream the heat exchanger 11. The main function of said dosing gas is to control the solid recirculation flow from the downcomer 2 to the riser 1 through the restriction 21.

The flow rate of the dosing gas is adjusted by means of a pneumatic control valve 24, placed on the line 23, which is for instance a mechanical valve, such as a butterfly valve.

A photometric instrument 25 is placed in correspondence of the bottom of the downcomer 2 above said line 23, and is fitted to the wall of the downcomer 2. As described in the patent application WO 2004/078792, this photometric instrument 25 provides an evaluation of the velocity of the polymer particles flowing in the downcomer 2, the evaluation being converted into a digital signal which is sent to an Advanced Process Controller (APC) 26.

Depending on the evaluation of the velocity, the APC 26 acts on the opening of the control valve 24, thus adjusting the flow rate of the dosing gas introduced via line 23 into the downcomer 2. Furthermore, the APC 26 is also capable of adjusting the opening of the control valve 22 placed in the restriction 21. As a result, the APC 26 controls the average velocity of the polymer particles maintaining said velocity at the desired value.

In synthesis, the flow Fp of polymer particles circulated between the second polymerization zone 2 and the first polymerization zone 1 is conveniently adjusted by varying the opening of the control valve 22 at the bottom of the downcomer and/or by varying the flow rate of dosing gas entering the downcomer via line 23. The flow rate $L_B$ of liquid barrier fed to the upper portion of downcomer 2 is adjusted by means of the control valve 20.

As previously explained, according to the invention the ratio $Fp/L_B$ is conveniently maintained at values comprised between 10 and 50, so as to maintain inside the downcomer 2 a plug flow of polymer particles as much as possible regular.

The polymerization process of the invention allows the preparation of a large number of polyolefin blends with a large flexibility as regards the mutual ratio of the (co)polymer components contained in the blend.

Examples of bimodal polyolefins that can be obtained are:
bimodal polyethylene blends comprising a low molecular weight fraction and a high molecular weight fraction;
bimodal polypropylene blends comprising a low molecular weight fraction and a high molecular weight fraction;
polypropylene blends containing a propylene homopolymer and a random copolymer deriving from copolymerization of propylene with little amounts, up to 15% by wt, of comonomers selected from ethylene, 1-butene and 1-hexene;

The above mentioned bimodal polyethylene blends are particularly suitable to be subjected to injection molding for preparing shaped articles. The above mentioned polypropylene blends may be used to prepare films and fibers.

The polymerization process of the present invention can be carried out upstream or downstream other conventional polymerization technologies (either in a liquid-phase or a gas-phase) to give rise a sequential multistage polymerization process. For instance, a fluidised bed reactor can be used to prepare a first polymer component, which is successively fed to the gas-phase reactor of FIG. 1 to prepare a second and a third polymer component. Accordingly, an ethylene polymer endowed with a tri-modal molecular weight distribution can be obtained, as well as a polypropylene blend comprising three components having a different content in ethylene.

The gas-phase polymerization process herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction can be carried out in the presence of highly active catalytic systems, such as Ziegler-Natta catalysts, single site catalysts, chromium-based catalysts, vanadium-based catalysts.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Particularly for the preparation crystalline polymers of $CH_2CHR$ olefins, where R is a C1-C10 hydrocarbon group, internal electron donor compounds can be supported on the $MgCl_2$. Typically, they can be selected among esters, ethers, amines, and ketones. In particular, the use of compounds belonging to 1,3-diethers, cyclic ethers, phthalates, benzoates, acetates and succinates is preferred.

When it is desired to obtain a highly isotactic crystalline polypropylene, it is advisable to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate. The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a C1-C10 alkyl group, in particular methyl.

Other useful catalysts are the vanadium-based catalysts, which comprise the reaction product of a vanadium compound with an aluminum compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$, vanadium acetyl acetonate.

Other useful catalysts are those based on chromium compounds, such as chromium oxide on silica, also known as Phillips catalysts.

Other useful catalysts are single site catalysts, for instance metallocene-based catalyst systems which comprise:
at least a transition metal compound containing at least one Π bond;
at least an alumoxane or a compound able to form an alkyl-metallocene cation; and
optionally an organo-aluminum compound.

A preferred class of metal compounds containing at least one n bond are metallocene compounds belonging to the following formula (I):

$$Cp(L)_q AMX_p \quad (I)$$

wherein M is a transition metal belonging to group 4, 5 or to the lanthanide or actinide groups of the Periodic Table of the Elements; preferably M is zirconium, titanium or hafnium;
the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph, -Bz, —$CH_2SiMe_3$, —OEt, —OPr, —OBu, —OBz and —$NMe_2$;
p is an integer equal to the oxidation state of the metal M minus 2;
n is 0 or 1; when n is 0 the bridge L is not present;
L is a divalent hydrocarbon moiety containing from 1 to 40 carbon atoms, optionally containing up to 5 silicon atoms, bridging Cp and A, preferably L is a divalent group $(ZR^7{}_2)_n$; Z being C, Si, and the $R^7$ groups, equal to or different from each other, being hydrogen or a hydrocarbon radical containing from 1 to 40 carbon atoms;
more preferably L is selected from $Si(CH_3)_2$, $SiPh_2$, SiPhMe, $SiMe(SiMe_3)$, $CH_2$, $(CH_2)_2$, $(CH_2)_3$ or $C(CH_3)_2$;
Cp is a substituted or unsubstituted cyclopentadienyl group, optionally condensed to one or more substituted or unsubstituted, saturated, unsaturated or aromatic rings;
A has the same meaning of Cp or it is a $NR^7$, —O, S, moiety wherein $R^7$ is a hydrocarbon radical containing from 1 to 40 carbon atoms;
Alumoxanes used as component b) are considered to be linear, branched or cyclic compounds containing at least one group of the type:

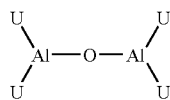

wherein the substituents U, same or different, are defined above.

In particular, alumoxanes of the formula:

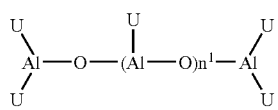

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

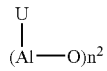

can be used in the case of cyclic compounds, wherein $n^2$ is an integer from 2 to 40 and the U substituents are defined as above.

The catalyst may suitably be employed in the form of a pre-polymer powder prepared beforehand during a pre-polymerization stage with the aid of a catalyst as described above. The pre-polymerization may be carried out by any suitable process, for example, polymerization in a liquid hydrocarbon diluent or in the gas phase using a batch process, a semi-continuous process or a continuous process.

The following examples will further illustrate the present invention without limiting its scope.

EXAMPLES

Characterization
Polydispersity index (PI): this property is strictly connected with the molecular weight distribution of the polymer under examination. It is inversely proportional to the creep resistance of the polymer in molten state. Said resistance, called modulus separation at low modulus value, i.e. 500 Pa, was determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus

Example 1

—Preparation of a Bimodal Polypropylene—

The process of the invention was carried out under continuous conditions in a plant comprising a reactor having interconnected polymerization zones, as shown in FIG. 1.

A Ziegler-Natta catalyst was used as the polymerization catalyst, comprising:
   a titanium solid catalyst component prepared with the procedure described in WO 00/63261, Example 10, according to which diethyl 2,3-diisopropyl-succinate is used as an internal donor compound;
   triethylaluminium (TEAL) as a cocatalyst;
   dicyclopentyldimethoxysilane as an external donor.

The above components were pre-contacted in a pre-activation vessel at a temperature of 15° C. for 10 minutes with a weight ratio TEAL/(solid catalyst component) of 5 and a weight ratio TEAL/(external donor) of 3.5.

The activated catalyst was fed via line 5 to the gas-phase polymerization reactor, where propylene was polymerized using $H_2$ as the molecular weight regulator and in the presence of propane as an inert diluent. The polymerization was carried out at a temperature of 78° C. and at a pressure of 30 bar.

The operative conditions were selected so as to prepare a low molecular weight (LMW) polypropylene in the riser 1 and a high molecular weight (HMW) polypropylene in the downcomer 2.

Condition (a) as claimed in the process of the present invention was achieved by feeding a liquid barrier Lb via line 19 to the upper part of the downcomer 2.

Condition (b) as claimed in the process of the present invention was achieved by adjusting the flow rate Fp of polymer continuously circulated between the downcomer and the riser, so as to set the ratio $R=F^p/Lb=14.8$ The compositions of the reaction mixture inside the riser and in the downcomer are given in Table 1, as well as the molar composition of the liquid barrier Lb.

Table 2 indicates the values of the parameters Lb, Fp, R and Fp/Fd (Fd=flow rate of polymer discharged from reactor), which are selected according to the teaching of present invention.

A bimodal polypropylene containing a high molecular weight fraction and a low molecular weight fraction was continuously discharged from the bottom of the downcomer via line 6. The polydispersity index PI of the obtained polyolefin was measured to be equal to 15.5.

Example 2

Preparation of a Bimodal Random Copolymer

The same Ziegler-Natta catalyst system of Example 1 was used, pre-activated with the same modality indicated in Example 1.

The activated catalyst was fed via line 5 to the gas-phase polymerization reactor, where propylene and ethylene were polymerized using $H_2$ as the molecular weight regulator, and in the presence of propane as an inert diluent. The polymerization was carried out at a temperature of 77° C. and at a pressure of 31 bar.

The operative conditions were selected so as to prepare a low molecular weight (LMW) random copolymer in the riser 1 and a high molecular weight (HMW) random copolymer in the downcomer 2.

Condition (a) as claimed in the process of the present invention was achieved by feeding a liquid barrier Lb via line 19 to the upper part of the downcomer 2.

Condition (b) as claimed in the process of the present invention was achieved by adjusting the flow rate Fp of polymer continuously circulated between the downcomer and the riser, so as to set the ratio R=Fp/Lb=12.1

The compositions of the reaction mixture inside the riser and in the downcomer are given in Table 1, as well as the molar composition of the liquid barrier Lb.

Table 2 indicates the values of the parameters Lb, Fp, R and Fp/Fd selected according to the teaching of present invention.

A bimodal random copolymer was continuously discharged from the bottom of the downcomer via line 6. The polydispersity index PI of the obtained polyolefin was measured to be equal to 12.7.

Example 3

—Preparation of a Bimodal Random Copolymer—

A Ziegler-Natta catalyst was used as the polymerization catalyst comprising:
- a titanium solid catalyst component prepared with the procedure described in EP 728 769, Example 5, lines 46 to 53, according to which di-isobutyl phthalate is used as an internal donor compound;
- triethylaluminium (TEAL) as a cocatalyst;
- dicyclopentyldimethoxysilane as an external donor.

About 3 g/h of solid catalyst component are fed to a pre-contacting vessel, the weight ratio TEAL/solid component being of 7, the weight ratio TEAL/external donor being of 4. The above catalyst components are pre-contacted at a temperature of 15° C. for 10 minutes. The activated catalyst was fed via line 5 to the gas-phase polymerization reactor, where propylene and ethylene were polymerized using $H_2$ as the molecular weight regulator, and in the presence of propane as an inert diluent. The polymerization was carried out at a temperature of 77° C. and at a pressure of 31 bar.

The operative conditions were selected so as to prepare a low molecular weight (LMW) random copolymer in the riser 1 and a high molecular weight (HMW) random copolymer in the downcomer 2.

Condition (a) as claimed in the process of the present invention was achieved by feeding a liquid barrier Lb via line 19 to the upper part of the downcomer 2.

Condition (b) as claimed in the process of the present invention was achieved by adjusting the flow rate Fp of polymer continuously circulated between the downcomer and the riser, so as to set the ratio R=Fp/Lb=23.1

The compositions of the reaction mixture inside the riser and in the downcomer are given in Table 1, as well as the molar composition of the liquid barrier Lb.

Table 2 indicates the values of the parameters Lb, Fp, R and Fp/Fd selected according to the teaching of present invention.

A bimodal random copolymer was continuously discharged from the bottom of the downcomer via line 6. The polydispersity index PI of the obtained polyolefin was measured to be equal to 9.4.

Example 4

—Preparation of a Polypropylene Blend—

The same Ziegler-Natta catalyst system of Example 1 was used.

The activated catalyst was fed via line 5 to the gas-phase polymerization reactor. The polymerization was carried out at a temperature of 72° C. and at a pressure of 28 bar in the presence of $H_2$ as the molecular weight regulator and propane as the inert diluent.

Condition (a) as claimed in the process of the present invention was achieved by feeding a liquid barrier Lb via line 19 to the upper part of the downcomer 2.

Condition (b) as claimed in the process of the present invention was achieved by adjusting the flow rate Fp of polymer continuously circulated between the downcomer and the riser, so as to set the ratio R=Fp/Lb=14.2

The compositions of the reaction mixture inside the riser and in the downcomer are given in Table 1, as well as the molar composition of the liquid barrier Lb.

Table 2 indicates the values of the parameters Lb, Fp, R and Fp/Fd selected according to the teaching of present invention.

The ratio $[C_2H_4/(C_2H_4+C_3H_6)]_{riser}/[C_2H_4/(C_2H_4+C_3H_6)]_{downer}$ gives an evaluation of the efficiency of the liquid barrier Lb to differ the monomers composition inside the riser and the downcomer. This parameter results to be equal to 6.1, so that the monomer compositions are remarkably different.

A polypropylene blend comprising a propylene/ethylene random copolymer and a propylene homopolymer was continuously discharged from the bottom of the downcomer via line 6.

The polydispersity index PI of the obtained polyolefin was measured to be equal to 6.7

Example 5 (Comparative)

The same Ziegler-Natta catalyst system of Example 4 was used.

The activated catalyst was fed via line 5 to the gas-phase polymerization reactor. The polymerization was carried out at a temperature of 72° C. and at a pressure of 28 bar in the presence of $H_2$ as the molecular weight regulator and propane as the inert diluent.

With respect to example 4, the flow rate of liquid barrier Lb was decreased from 26 t/h to the value of 13.5 t/h and simultaneously the flow rate Fp was increased from 368 t/h to the value of 703 t/h, so that to operate the gas-phase reactor with a ratio R=52.1 i.e. outside the range claimed in the present invention.

The compositions of the reaction mixture inside the riser and in the downcomer are given in Table 1, as well as the molar composition of the liquid barrier Lb. Table 2 indicates the values of the parameters Lb, Fp, R and Fp/Fd.

The ratio $[C_2H_4/(C_2H_4+C_3H_6)]_{riser}/[C_2H_4/(C_2H_4+C_3H_6)]_{downer}$ gives an evaluation on the efficiency of the liquid barrier to differ the monomers composition inside the riser and the downcomer. This parameter results to be 1.1, so that riser and downcomer produce substantially the same polyolefin.

This example demonstrates that that when operating at R>50, the liquid barrier Lb fed to the top of the downcomer is unable to differentiate the monomers composition inside the riser and the downcomer.

Example 6 (Comparative)

—Preparation of a Bimodal Random Copolymer—

The same Ziegler-Natta catalyst system of Example 2 was used with the same pressure and temperature in the polymerization reactor.

With respect to example 2, the flow rate of liquid barrier Lb was increased from 24.7 t/h to the value of 30.0 t/h and simultaneously the flow rate Fp was decreased from 299 t/h to the value of 252 t/h, so that to operate the gas-phase reactor with a ratio R=8.4 i.e. outside the range claimed in the present invention.

The compositions of the reaction mixture inside the riser and in the downcomer are given in Table 1, as well as the molar composition of the liquid barrier Lb. Table 2 indicates the values of the parameters Lb, Fp, R and Fp/Fd.

The above operative conditions quickly brought to inoperability of the polymerization reactor, due to generation of polymer fluidization and sluggish conditions inside the downcomer: the polymer discharge valve was clogged by the formation of polymer agglomerates.

This example demonstrates that that when operating at R<10, it becomes very difficult to operate regularly the second polymerization zone of the reactor.

TABLE 1

|  |  | Ex. 1 | Ex. 2 | Ex. 3 | Ex. 4 | Ex. 5 (Comp.) | Ex. 6 (Comp.) |
|---|---|---|---|---|---|---|---|
| Riser composition | T (° C.) | 78 | 77 | 72 | 72 | 72 | 77 |
|  | P (bar) | 30 | 31 | 28.5 | 28 | 28 | 31 |
|  | $H_2$ (% mol) | 17.2 | 6.1 | 0.47 | 1.0 | 1.0 | 11.5 |
|  | $C_2H_4$ (% mol) | — | 0.4 | 1.6 | 0.8 | 2.7 | 0.8 |
|  | $C_3H_6$ (% mol) | 72.1 | 73.1 | 89.53 | 82 | 78.4 | 82.7 |
|  | $C_3H_8$ (% mol) | 10.7 | 20.4 | 8.4 | 16.2 | 17.9 | 5 |
| Downcomer composition | $H_2$ (% mol) | 0.35 | 0.05 | 0.015 | 0.32 | 0.9 | 0.063 |
|  | $C_2H_4$ (% mol) | — | 0.35 | 1.7 | 0.13 | 2.5 | 0.44 |
|  | $C_3H_6$ (% mol) | 87.65 | 75.6 | 89.28 | 81.75 | 78.4 | 92.8 |
|  | $C_3H_8$ (% mol) | 12.0 | 24.0 | 9 | 17.8 | 18.2 | 6.7 |
| $[C_2H_4/(C_2H_4+C_3H_6)]_{riser} / [C_2H_4/(C_2H_4+C_3H_6)]_{downer}$ |  | — | 1.18 | 0.94 | 6.1 | 1.1 | — |
| Liquid Barrier composition | $H_2$ (% mol) | 0.01 | 0.01 | 0.01 | 0.26 | 0.01 | 0.01 |
|  | $C_2H_4$ (% mol) | — | 0.25 | 2.1 | 0.14 | 1.2 | 0.24 |
|  | $C_3H_6$ (% mol) | 87.99 | 75.74 | 85.89 | 82.36 | 76.79 | 92.25 |
|  | $C_3H_8$ (% mol) | 12.0 | 24 | 12 | 17.24 | 22 | 7.5 |

TABLE 2

|  | Example 1 | Example 2 | Example 3 | Example 4 | Example 5 (Comp.) | Example 6 (Comp.) |
|---|---|---|---|---|---|---|
| Fp (t/h) | 383 | 299 | 372 | 368 | 703 | 252 |
| Lb (t/h) | 26.0 | 24.7 | 16.1 | 26.0 | 13.5 | 30.0 |
| R | 14.7 | 12.1 | 23.1 | 14.2 | 52.1 | 8.4 |
| Fp/Fd | 23.5 | 18.5 | 20.8 | 21.8 | 39.2 | 15.7 |

The invention claimed is:

1. A process which comprises polymerizing α-olefins $CH_2$=CHR, where R is hydrogen or a hydrocarbon radical having 1-12 carbon atoms, in the gas phase in two interconnected polymerization zones, a riser and a downcomer, wherein the growing polymer particles flow through the riser under fast fluidization conditions, leave said riser and enter the downcomer through which they flow downward in a densified form, leave said downcomer and are reintroduced into said riser, thus establishing a circulation of polymer between the riser and the downcomer, wherein:

(a) the gas mixture present in the riser is totally or partially prevented from entering the downcomer by introducing into the upper part of said downcomer a liquid barrier $L_B$ wherein said liquid barrier LB comprises condensable inert compounds selected from $C_2$-$C_8$ alkanes, and having a composition different from the gaseous mixture present in the riser; and (b) the ratio R between the flow rate $F_p$ of polymer circulated between said downcomer and said riser and the flow rate $L_B$ of said liquid barrier is adjusted in a range from 10 to 50.

2. The process according to claim 1, wherein partial evaporation of said liquid barrier $L_B$ generates in said upper portion of the downcomer a flow of gas moving counter-currently to the downward flow of polymer.

3. The process according to claim 1, wherein said liquid barrier $L_B$ is obtained from condensation of fresh olefin monomers.

4. The process according to claim 1, wherein said liquid barrier $L_B$ comes from condensation of a part of the gaseous stream continuously recycled to the gas-phase reactor.

5. The process according to claim 1, wherein said flow rate $F_p$ ranges from 100 t/h to 2500 t/h.

6. The process according to claim 1, wherein the weight ratio between said flow rate $F_p$ and the flow rate of polymer discharged from the reactor ranges from 10 to 60.

7. The process according to claim 1, wherein said ratio $R=F_p/L_B$ ranges from 12 to 30.

8. The process according to claim 1, wherein said flow rate $F_p$ is adjusted by varying the opening of a control valve placed in a restriction at the bottom of said downcomer and/or the flow rate of a dosing gas entering the downcomer.

* * * * *